United States Patent [19]

Sula

[11] Patent Number: 5,342,254
[45] Date of Patent: Aug. 30, 1994

[54] END-OF-ARM TOOLING DEVICE

[75] Inventor: Daniel J. Sula, Niles, Ohio

[73] Assignee: General Motors Corporation, Detroit, Mich.

[21] Appl. No.: 925,939

[22] Filed: Aug. 5, 1992

[51] Int. Cl.$^5$ .............................................. B25J 15/00
[52] U.S. Cl. ................................. 475/230; 475/223; 901/25; 901/38
[58] Field of Search ................... 74/89.17, 422; 475/5, 475/223, 225, 230, 295, 331, 332, 336, 343, 900; 901/9, 23, 25, 26, 31, 36, 38, 39

[56] References Cited

U.S. PATENT DOCUMENTS

| | | | |
|---|---|---|---|
| 3,703,833 | 11/1972 | Olah | 74/422 X |
| 4,537,557 | 8/1985 | Whitney | 414/735 |
| 4,598,942 | 7/1986 | Shum et al. | 901/31 X |
| 4,600,228 | 7/1986 | Tarbuck | 294/64.1 |
| 4,699,414 | 10/1987 | Jones | 901/38 X |
| 4,702,667 | 10/1987 | Hounsfield et al. | 414/735 |
| 4,808,898 | 2/1989 | Pearson | 901/38 X |
| 4,817,440 | 4/1989 | Curtin | 73/862.04 |
| 4,957,320 | 9/1990 | Ulrich | 294/106 |
| 5,161,424 | 11/1992 | Saberton et al. | 74/89.17 X |

FOREIGN PATENT DOCUMENTS

| | | | |
|---|---|---|---|
| 309329 | 3/1989 | European Pat. Off. | 901/38 |
| 281135 | 8/1990 | Fed. Rep. of Germany . | |
| 3911302 | 10/1990 | Fed. Rep. of Germany . | |
| 2652776 | 4/1991 | France . | |
| 52-73463 | 6/1977 | Japan | 901/26 |
| 3-142182 | 6/1991 | Japan | 901/25 |
| 525542 | 11/1976 | U.S.S.R. | 901/25 |
| 1313688 | 5/1987 | U.S.S.R. | 901/25 |
| 1537528 | 1/1990 | U.S.S.R. . | |
| 1556895 | 4/1990 | U.S.S.R. | 901/38 |
| 1618648 | 1/1991 | U.S.S.R. . | |
| 1462628 | 3/1991 | U.S.S.R. . | |
| 1660954 | 7/1991 | U.S.S.R. | 901/38 |

Primary Examiner—Leslie A. Braun
Assistant Examiner—Khoi Ta
Attorney, Agent, or Firm—Ernest E. Helms

[57] ABSTRACT

An end-of-arm tooling device for a robot or like manipulator is provided which, in a preferred embodiment, includes a differential separating a first torsional input into first and second torsional outputs, and two jaws for interacting with a workpiece powered by a separate one of the first and second torsional outputs, and wherein, upon interaction with the workpiece at a predetermined torque level by one of the jaws, the jaw's motion will be stopped and torque will be continually transferred to the remaining jaw.

1 Claim, 4 Drawing Sheets

END-OF-ARM TOOLING DEVICE

FIELD OF THE INVENTION

The field of the present invention is that of end-of-arm tooling devices (EOAT) for a robot or like mechanical manipulators.

DISCLOSURE STATEMENT

Present-day industrial robots are capable of highly repetitive motion, but in most cases have relatively poor accuracy. Most industrial robots with repeatabilities in the range of 0.05 inches may have absolute positioning accuracies of only 0.25 inch. Repeatability refers to the positional deviation from the average position achieved by repetitive motion between a start point and a target point. The target location is typically "taught" using an on-line process in which the manipulator is physically moved by the programmer to assigned locations. This "teaching" is used for programming critical points in most industrial manufacturing robot applications and is a reliable but time-consuming process. A robot's accuracy refers to its ability to reach a location specified by coordinates often specified by some off-line process such as a computer-assisted design/computer-assisted manufacturing (CAD/CAM) process. The accuracy of the robot is determined by several factors. Mechanical inaccuracies can be caused by backlash in the joints and bending of the length of the manipulator. The controller may contribute inaccuracies due to round-off errors. The resolution of the manipulator's positional feedback system also affects accuracy performance capability.

A major reason industrial robots are not used in many manufacturing operations is inaccuracy. If the accuracy of the robot were enhanced, significant amounts of development time could be eliminated in cases where repeated installations of applications are to be installed. A more accurate industrial robot could allow the off-line programming of an application, further reducing development time.

Still another problem with many prior end-of-arm tooling devices is that to make the device compliant requires separate drive systems for each individual finger. Typically, not only did this require separate drive systems, but further required complex control programming.

SUMMARY OF THE INVENTION

The present invention overcomes the above-noted problems by providing an EOAT with a compliant finger drive transmission and, in a preferred embodiment, an encoder system that will allow the EOAT to grip an object off-center from the EOAT and measure the offset to determine the accuracy. With these capabilities, the present EOAT may be used to obtain offset measurement on gauges of known size and location and to calibrate the robot's position in the "real world." In this manner, the present invention provides an EOAT which increases the robot's accuracy, making off-line robotic programming more practical.

DETAILED DESCRIPTION OF THE INVENTION

Figure 1:
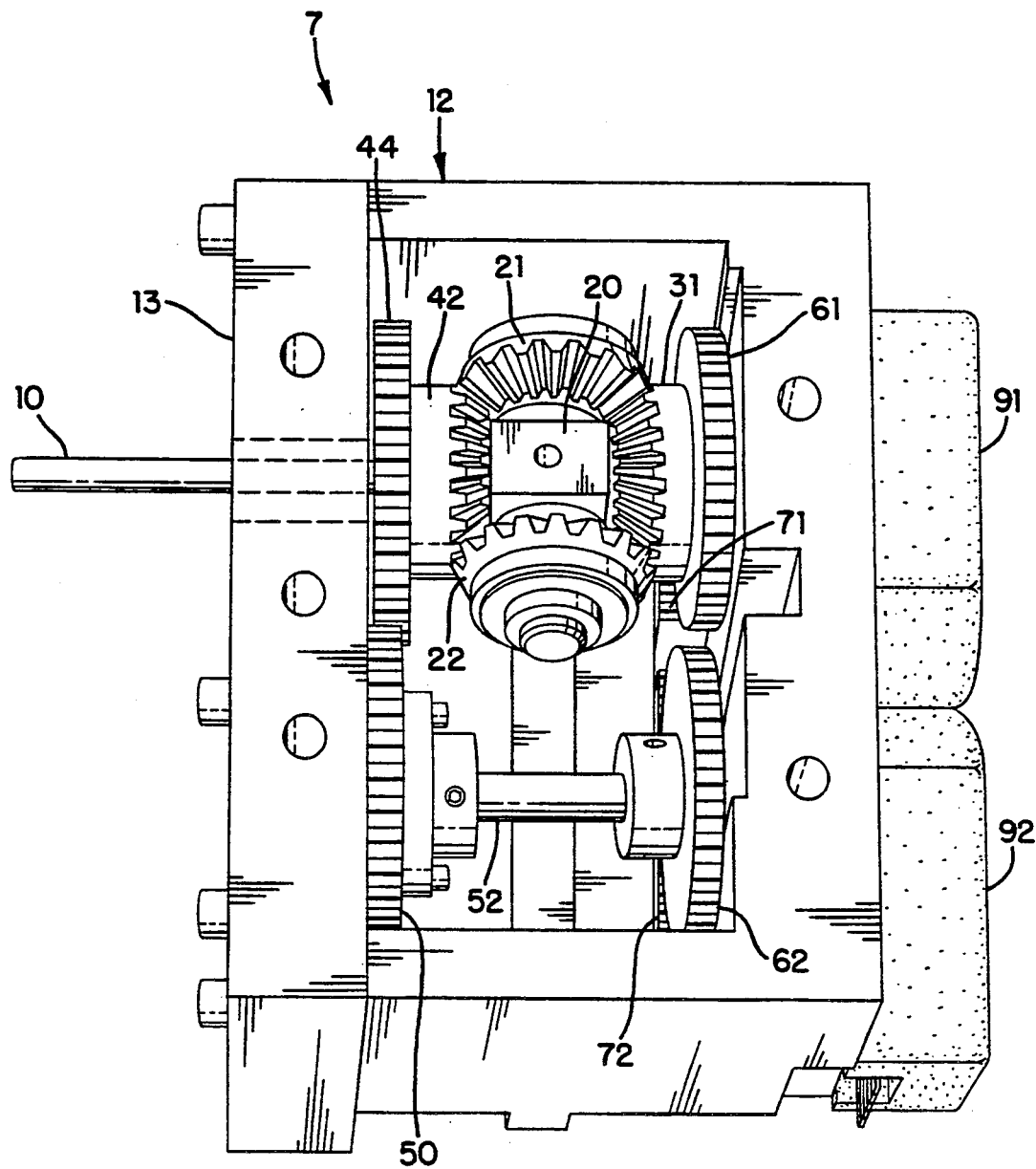
FIG. 1 is a rear perspective view of a preferred embodiment gear box of an EOAT of the present invention.

Referring to FIGS. 1 through 4, the end-of-arm tooling device (EOAT) 7 has a frame 12. The frame 12 has an end providing for a face plate 13 for connection to a robot or like manipulator (not shown). The EOAT 7 is powered by a variable torque motor 11, typically pneumatic or electrical, which may be physically connected with the EOAT 7 or taken from a power take-off shaft from a wrist of the robot itself.

The motor 11 provides a first torsional input to a first shaft 10. Shaft 10 is fixably connected with a cross shaft 20. The cross shaft 20 has rotatably attached thereto a first planet bevel gear 21 and a second planet bevel gear 22. Meshed with the planet bevel gears 21 and 22 are a first output bevel gear 31 and a second output bevel gear 42. The output gear 42 is fitted over the shaft 10 directly or by means of a bearing. The output gear 42 is physically connected with a gear 44. The gear 44 meshes with a reversing gear 50 which is fixably connected to a shaft 52. Shaft 52 has at its end a fixably connected gear 62.

Output gear 31 is fixably connected with a gear 61. The gear 61 is also rotatably mounted directly or via a bearing over shaft 10. The gear 61 is engaged with a rack gear 71. In like manner, the gear 62 is engaged with a rack gear 72. The rack gear 71 has fixably connected thereto a jaw member 81 (not shown in FIG. 2) and is spring biased to an open position by a spring 85. In like manner, the rack gear 72 has an associated jaw 82 which is spring biased to the open position by a spring 85.

The end-of-arm tooling device is capable of inducing friction upon the movement of the jaws 81,82 by a variable induced friction device 100. Friction device 100 induces friction via a friction pad 101 which is biased by a spring 104 away from the rack gear 71. A chamber 102 has a slidably-mounted piston which is responsive to pneumatic pressure to move the friction pad 101 toward the rack gear 71. By varying the pneumatic pressure, the imposed friction force upon the movement of the jaw 81 is varied. A friction device 100 is also provided for the jaw 82. It has been found that the preferred friction setting often is a function of workpiece weight.

Figure 2:
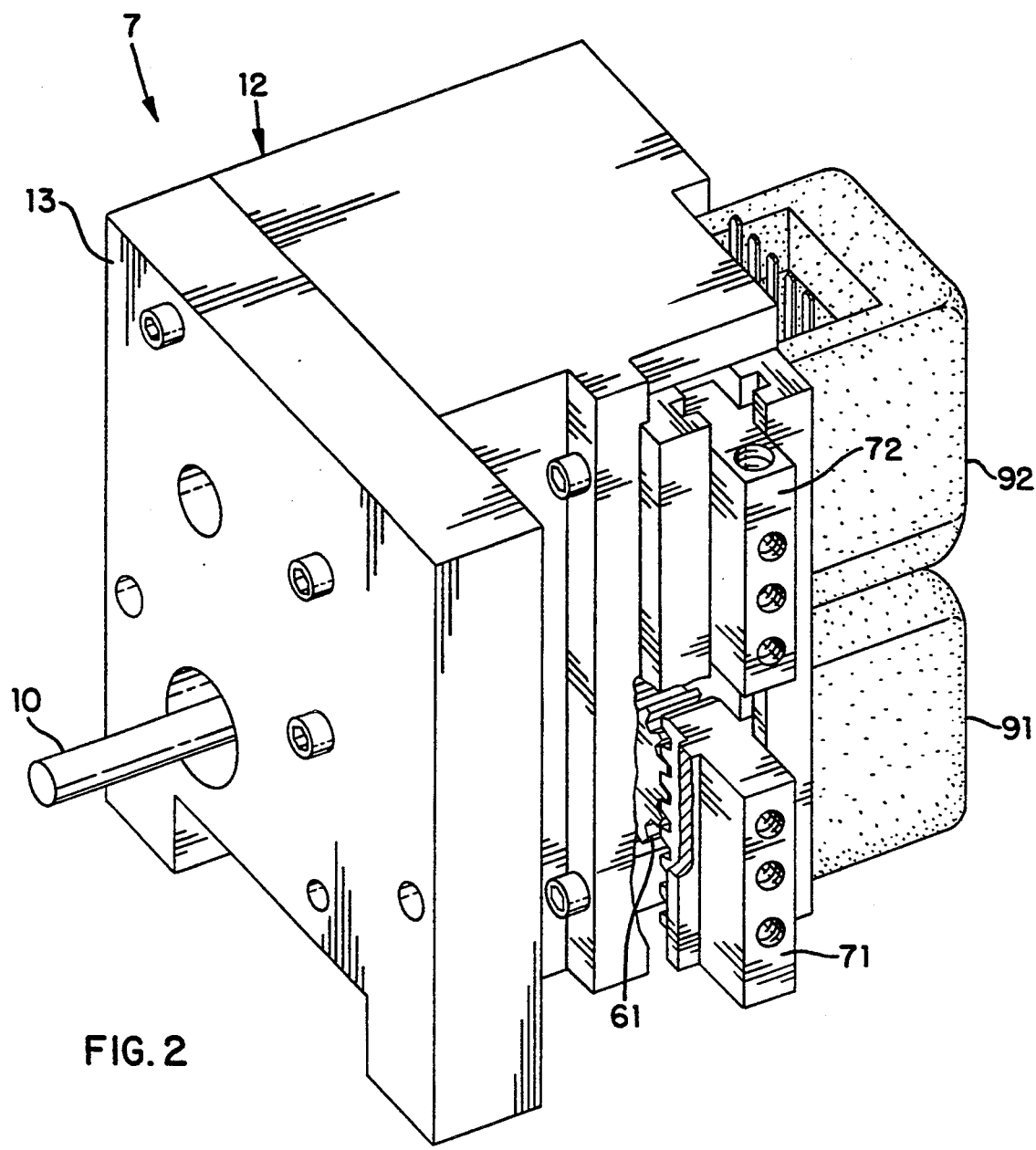
FIG. 2 is a front perspective view of the gripper portion of the EOAT of the present invention.
Figure 3:
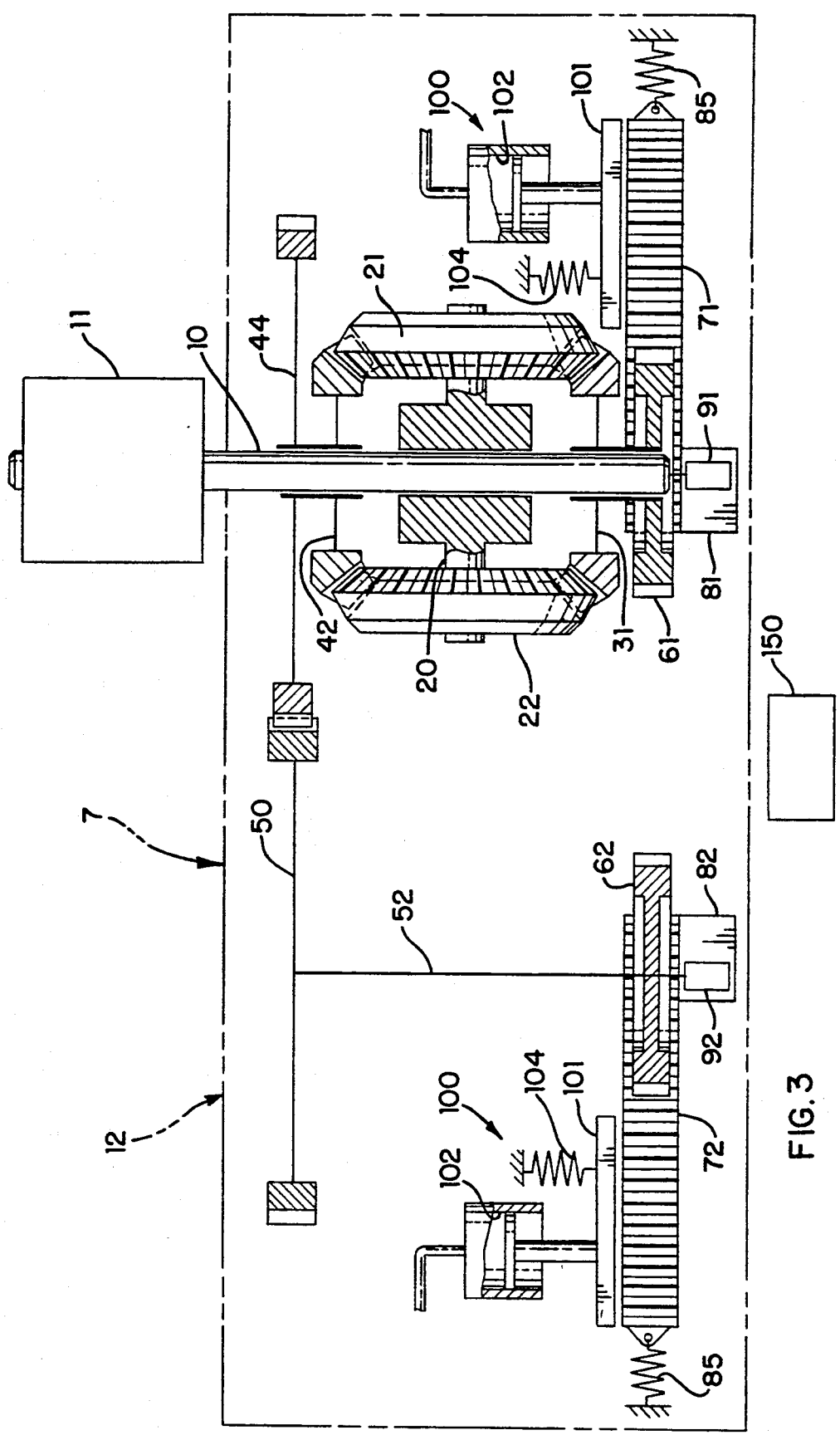
FIGS. 3 and 4 are schematic views of the present invention EOAT.
Figure 4:
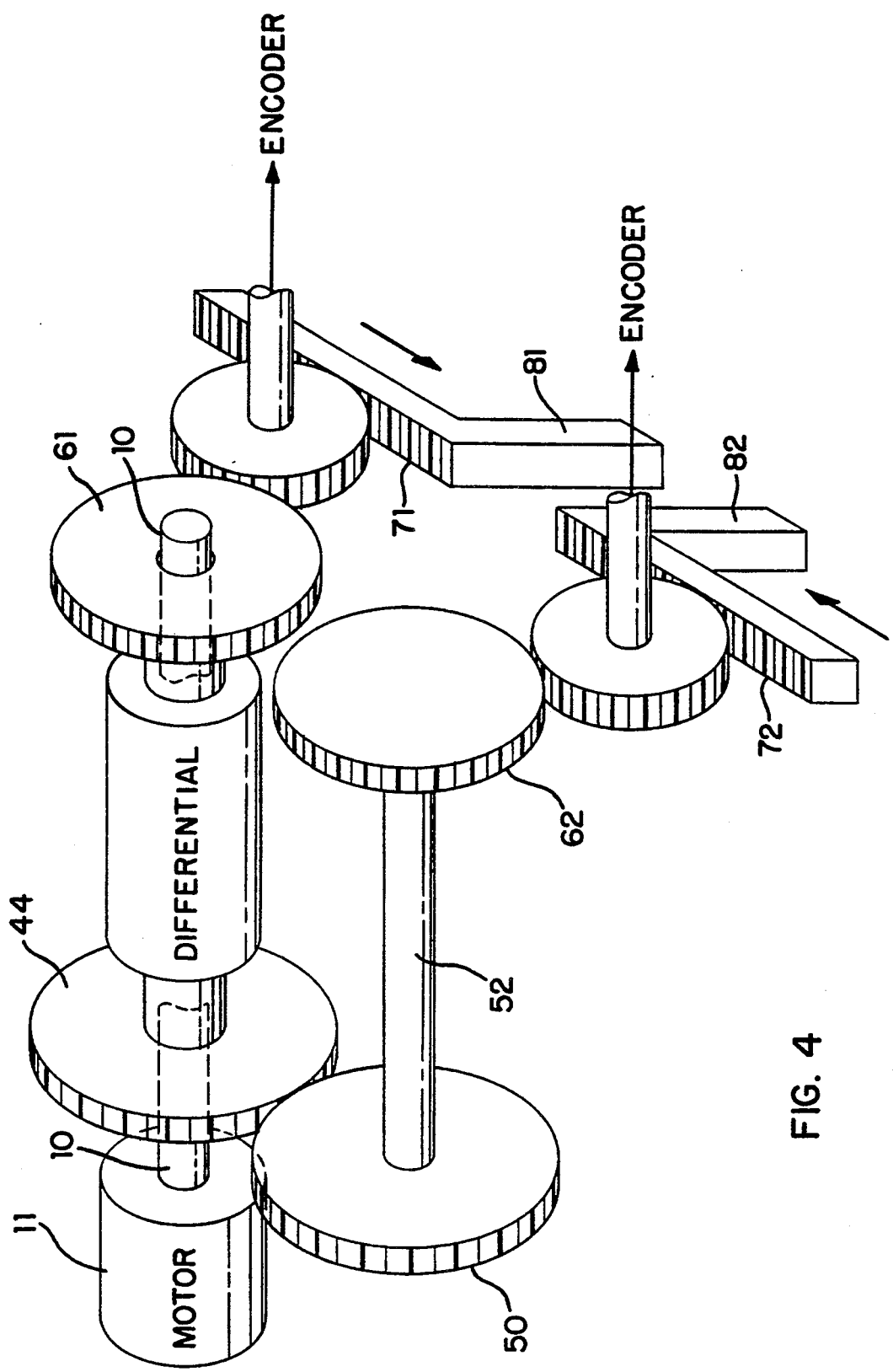

To determine the location of the jaws 81, 82 and to provide a signal in response thereto, there are encoders 91 and 92 which determine the angular rotational position of gears 61 and 62, respectively. The information from the encoders 91, 92 is fed back to a robotic controller (not shown). The robotic controller also controls the torque input of the motor 11 and the amount of imposed friction provided by the friction devices 100. (Note: In FIGS. 1, 2 and 4, the motor 11, friction devices 100 and biasing springs 85 have been eliminated for clarity of illustration.)

In operation, the robot will position the EOAT 7 in the general vicinity of the workpiece 150. Usually, the robot will be programmed to position the EOAT so that the jaw members 82 and 81 will be an equal distance from the workpiece 150. Due to discrepancy in the positioning of the robot and/or discrepancies in the location of the workpiece 150, typically one jaw will be closer to the workpiece 150 than the other jaw.

The motor 11 will turn the shaft 10. The gears 21, 22, 31 and 42 act as a bevel differential and, therefore, as long as there are no objects preventing movement of the jaws 81 and 82, both jaws will move inward against their biasing provided by spring 85. The spring biasing is provided to prevent backlash in the gearing.

The encoders 91 and 92 will feed information to the robot to allow the robot to know how far the jaws 81 and 82 have moved. As mentioned previously, the shaft 10 will turn, causing the cross-shaft 20 to turn with it. Planet gears 21 and 22 essentially will not rotate; therefore, they will act as if they are fixed to the cross-shaft 20 and rotate the gears 42 and 31. The gear 31 causes rotation of the gear 61, which in turn moves the rack 71 and jaw 81. To get the opposite direction in the movement of jaw 82, there is a reversing gear 50 which meshes with the gear 44 which, as mentioned previously, is fixed with the gear 42. The above, in turn, causes rotation of gear 61, which therefore causes movement in the rack 72.

If, for instance, the jaw 81 contacts the workpiece 150, it will be urged toward the workpiece 150 until a certain torque value is reached. Thereupon, the gear 61 will be stalled out, stalling gear 31. With the end of rotation gear of gear 31, the planet gears will now rotate upon their respective rotational axes which are parallel with the cross-shaft 20 and divert all of the torque from the motor 11 to the gear 42, which in turn will cause the continued movement of the jaw 82. If it were desired to make a three-jaw EOAT, another differential would be connected between the gears 44 and 50. The output of that differential would be fed to gear 50 and to the gear 62 which controls the operation of the other associated jaw 82.

As mentioned previously, when the jaw 81 hits the workpiece 150, all torque will then be automatically transferred to jaw 82, which will then continue its motion until it hits the workpiece 150. The encoder 91 will allow the controller to know that jaw 81 has stopped, thereby informing the robot of the location of workpiece 150. The jaw 82 will continue to move until it hits the workpiece 150 at which point the encoder 92 will inform the robot on the whereabouts of the other side of the workpiece.

The information by the encoders 91 and 92 may be utilized in a few different manners. One manner is to allow the robotic controller to know about the location of the workpiece 150. Conversely, the workpiece 150 may be a test location piece, and the robot may be programmed to grab the workpiece with the jaws 81 and 82 and therefore know the exact location of the robot's arm by the readings provided by the encoders 91 and 92 and then recalibrate the robot controller's guidance system.

The information may also be utilized in other instances to tell the approximate size of the workpiece 150 in situations where the robot may be utilized on different size workpieces and therefore interpret this information to determine which part that the robot jaws 91 and 92 are gripping.

Additionally, there is provided, as mentioned previously, the friction device 100. These variable friction devices 100 are beneficial in that after the jaws 81 and 82 have gripped the device, the friction device 100 will lock the racks and therefore prevent any movement of the racks upon movement of the robot arm after the EOAT 7 has picked up the workpiece, thereby insuring a firm grip upon the workpiece.

In instances where very light workpieces are being utilized, the motor 11 will be put on a low torque and the friction device 100 will be held off to provide little or no induced friction. Upon engagement of the first jaw 81, all torque will then be transferred to the jaw 82. Initially, low torque will be utilized when picking up delicate workpieces; however, to add speed, a high torque setting will be initialized after one of the jaws 81, 82 has made contact with the workpiece 150. After the second jaw makes contact with the workpiece, the friction device 100 will then lock the jaws 81, 82 in position to insure a firm grip upon the workpiece. This locking will only occur after the encoders 91 and 92 have sensed that there is no further movement on the jaws after their contact with the workpiece.

Accordingly, while my invention has been described in terms of a specific embodiment thereof, it will be appreciated that other forms could readily be adapted, and therefore the scope of my invention is to be considered limited only by the following claims.

The embodiments of the invention in which an exclusive property or privilege is claimed are defined as follows:

1. An end-of-arm tooling device for a robot for interacting with a workpiece comprising:
    power means providing a first torsional input;
    at least one input shaft powered by the power means;
    a cross shaft connected to the input shaft, the cross shaft having rotatably attached thereto first and second bevel planet gears;
    a first bevel output sun gear concentrically fitted over the input shaft meshed with the first and second bevel planet gears;
    a second bevel output sun gear concentrically fitted over the input shaft meshed with the first and second bevel planet gears;
    a first jaw means torsionally associated with the first bevel output sun gear to interact with the workpiece; and
    a second jaw means torsionally associated with the second bevel output sun gear to interact with the workpiece.

* * * * *